United States Patent
Anthonis et al.

(10) Patent No.: US 6,689,195 B1
(45) Date of Patent: Feb. 10, 2004

(54) CRYSTALLINE MOLECULAR SIEVE LAYERS AND PROCESSES FOR THEIR MANUFACTURE

(76) Inventors: Marc Henri Carolina Anthonis, Moniestraat 30, Hofstade (BE), B-1981; Anton-Jan Bons, Tiensesteenweg 259, Kessel-Lo (BE), 3010; Harry William Deckman, 2 Woods Edge Ct., Clinton, NJ (US) 08809; Jonas Hedlund, Spranggatan 29, Luleå (SE), S-97432; Wenyih F. Lai, 656 Bellerive Ct., Bridgewater, NJ (US) 08807; Jacobus Anna Josephus Peters, Kennemerstraatweg 147, Alkmaar (NL), 1814 GH ( * ) Notice: Subject to any disclaimer, the term of this patent is extended or adjusted under 35 U.S.C. 154(b) by 0 days.

(21) Appl. No.: 09/936,196

(22) PCT Filed: Mar. 10, 2000

(86) PCT No.: PCT/EP00/02127
§ 371 (c)(1),
(2), (4) Date: Jun. 20, 2002

(87) PCT Pub. No.: WO00/53297
PCT Pub. Date: Sep. 14, 2000

(30) Foreign Application Priority Data

Mar. 11, 1999 (GB) ............................................. 9905561

(51) Int. Cl.$^7$ ................................................. B01J 29/06
(52) U.S. Cl. .............................. 95/143; 95/147; 502/4; 502/60; 502/64; 502/62; 502/71; 502/77
(58) Field of Search ................................ 502/4, 60, 62, 502/64, 71, 77; 95/143, 147

(56) References Cited

U.S. PATENT DOCUMENTS

| 5,258,339 A | | 11/1993 | Ma et al. | |
| 5,763,347 A | * | 6/1998 | Lai | 502/4 |
| 6,037,292 A | * | 3/2000 | Lai et al. | 502/60 |
| 6,051,517 A | * | 4/2000 | Funke et al. | 502/4 |
| 6,190,638 B1 | * | 2/2001 | Anthonis et al. | 423/702 |
| 2003/0104925 A1 | * | 6/2003 | Lai et al. | 502/4 |

FOREIGN PATENT DOCUMENTS

| WO | WO 94/25151 | 11/1994 |
| WO | WO 96/01686 | 1/1996 |
| WO | WO 97/33684 | 9/1997 |

* cited by examiner

*Primary Examiner*—Tom Dunn
*Assistant Examiner*—Christina Ildebrando (57) ABSTRACT

A process is described for the manufacture of crystalline molecular sieve layers with good para-xylene over meta-xylene selectivity's good para-xylene permeances and selectivities. The process requires impregnation of the support prior to hydrothermal synthesis using the seeded method and may be undertaken with pre-impregnation masking. The crystalline molecular sieve layer has a selectivity ($\alpha_x$) for para-xylene over meta-xylene of 2 or greater and a permeance ($Q_x$) for para-xylene of $3.27 \times 10^{-8}$ mole(px)/m$^2$.s.Pa (px) or greater measured at a temperature of $\geq 250°$ C. and an aromatic hydrocarbon partial pressure of $\geq 10 \times 10^3$ Pa.

27 Claims, 2 Drawing Sheets

CRYSTALLINE MOLECULAR SIEVE LAYERS AND PROCESSES FOR THEIR MANUFACTURE

This invention relates to crystalline molecular sieve layers, to processes for their manufacture, and to their use.

Molecular sieves find many uses in physical, physicochemical, and chemical processes; most notably as selective sorbents, effecting separation of components in mixtures, and as catalysts. In these applications the crystallographically-defined pore structure within the molecular sieve material is normally required to be open; it is then a prerequisite that any structure-directing agent, or template, that has been employed in the manufacture of the molecular sieve be removed, usually by calcination. Numerous materials are known to act as molecular sieves, among which zeolites form a well-known class.

In International Application WO 94/25151 is described a supported inorganic layer comprising optionally contiguous particles of a crystalline molecular sieve, the mean particle size being within the range of from 20 nm to 1 $\mu$m. The support is advantageously porous. When the pores of the support are covered to the extent that they are effectively closed, and the support is continuous, a molecular sieve membrane results; such membranes have the advantage that they may perform catalysis and separation simultaneously if desired. A number of processes are described in WO 94/25151 for the manufacture of the inorganic layers disclosed therein. WO94/25151 describes the use of a barrier layer which prevents the water in the aqueous coating suspension used from preferentially entering the pores of the support to an extent such that the silica and zeolite particles form a thick gel layer on the support. The barrier layer may be temporary or permanent; temporary barrier layers are fluids such as water or glycol. The membranes of WO 94/25151 exhibited selectivities of para-xylene over ortho-xylene of 20.76 to 60.10 and para-xylene permeances of $1.09 \times 10^{-8}$ mole(px)/m$^2$.s.Pa(px) (10 kg(px)/m$^2$.day.bar(px)) when measured at low temperature and pressure.

In International Application WO 96/01683 a structure is described which comprises a support, a seed layer, and an upper layer, the seed layer comprising a crystalline molecular sieve having a crystal size of at most 1 $\mu$m, and the upper layer comprising a crystalline molecular sieve of crystals having at least one dimension greater than the dimensions of the crystals of the seed layer. There are a number of processes described in WO 96/01683 for the manufacture of these layers.

In International Application WO 97/25129 a structure is described which comprises a crystalline molecular sieve layer on a substrate and an additional layer of refractory material to occlude voids in the molecular sieve layer. The structures described in the examples have para-xylene over meta-xylene selectivities of between 2 to 8.

In International Application WO 96/01686 a structure is described which comprises a substrate, a zeolite or zeolite-like layer, a selectivity enhancing coating in contact with the zeolite layer and optionally a permeable intermediate layer in contact with the substrate. Examples of these structures are given which have para-xylene over meta-xylene selectivities of between 1 to 10.

Xomeritikas and Tsapatsis in Chemical Materials, 1999, 11, 875–878, describe orientated MFI-type zeolite membranes which have been manufactured using secondary growth a process which requires two successive hydrothermal growths and produces membranes of 25 to 40 $\mu$m thickness. These membranes exhibited para-xylene over ortho-xylene selectivities of 18 when measured at a total aromatic hydrocarbon partial pressure of 27.5 Pa [=15 Pa pX+12.5 Pa oX] and 100° C. and 3.8 at a total aromatic hydrocarbon partial pressure of 550 Pa [=300 Pa pX+250 Pa oX] and 100° C., and permeances for para-xylene of 2.0 to $5.2 \times 10^{-8}$ mole/m$^2$.s.Pa [18 to 48 kg$_{px}$/m$^2$.day.bar$_{px}$], when tested at temperatures up to 200° C. and at low hydrocarbon partial pressures. The selectivity decreased with increasing partial pressure of para-xylene and it was observed by the authors that the membranes would not be suitable for separation of xylene isomers at elevated temperatures due to the 20 fold reduction in flux ratio at 200° C. compared to that observed at 100° C.

Many commercial petrochemical processes operate at elevated temperature and pressure. Whilst the molecular sieve layers of the prior art may exhibit good selectivity and permeance results when tested at low temperatures, pressures and/or hydrocarbon partial pressures, this is not repeated when tested at high temperatures and high hydrocarbon partial pressures. Thus, there is a need for molecular sieve layers with improved properties for catalytic and/or membrane applications, especially improved properties at elevated temperatures e.g. >250° C. and/or elevated hydrocarbon feed partial pressures >10×10$^3$ Pa.

The present invention is concerned with crystalline molecular sieve layers which have improved properties compared to crystalline molecular sieve layers in the art, especially for membrane applications. It has surprisingly been found that the control of a number of synthesis parameters for the manufacture of crystalline molecular sieve layers in conjunction with impregnation of the support onto which the crystalline molecular sieve layer is to be deposited during its synthesis, results in crystalline molecular sieve layers with properties, which hitherto have not been achieved.

The present invention in a first aspect provides a process for the manufacture of a crystalline molecular sieve layer, which process comprises:

a) providing a porous support having deposited thereon seeds of molecular sieve crystals of average particle size of 200 nm or less, b) impregnating the support with an impregnating material before or after deposition of the seeds of molecular sieve, c) contacting the impregnated support having seeds deposited thereon with a molecular sieve synthesis mixture, d) subjecting, the impregnated support having seeds deposited thereon, to hydrothermal treatment whilst in contact with the molecular sieve synthesis mixture to form a crystalline molecular sieve layer on the support, and e) removing the impregnating material from the support.

As examples of porous supports, there may be mentioned porous glass, sintered porous metals, e.g., steel or nickel, inorganic oxides, e.g., alpha-alumina, titania, cordierite, zeolite as herein defined, or zirconia and mixtures of any of these materials. In this context porous supports include supports which have pores which are occluded; such supports, whilst having pores which are not suitable for membrane separation applications, may be used for catalytic applications or separation processes which are not membrane separation processes such as for example adsorption or absorption.

The pore size and porosity of the support should be compatible with the process employed for depositing the molecular sieve seeds. The porous support may be any material compatible with the coating and synthesis techniques utilised in the process of the present invention. For example porous alpha-alumina with a surface pore size within the range of 0.08 to 1 μm, most preferably from 0.08 to 0.16 μm, and advantageously with a narrow pore size. Ideally the support should have a relatively high degree of porosity so that the support exerts an insignificant effect on flux through the finished product. Preferably the porosity of the support is 30% by volume or greater; ideally and preferably greater than 33%, and preferably within the range 33 and 40% by volume. The support may be multilayered; for example, to improve the mass transfer characteristics of the support; in this context the support may be an asymmetric support. In such a support the surface region which is in contact with the molecular sieve seeds may have small diameter pores, while the bulk of the support, toward the surface remote from the molecular sieve seeds, may have larger diameter pores. An example of such a multilayered asymmetric support is an alpha-alumina disk having pores of about 1 μm average diameter coated with a layer of alpha-alumina with average pore size of about 0.1 μm. A further example of a multilayered support is a large pore metal based support which has an inorganic layer (either metal or non-metal) deposited thereon of smaller pore size compared to the metal support. It is to be understood that when the support is a molecular sieve as herein defined and at least at its surface it has the requisite properties to function as a molecular sieve seed, in relation to particle size and crystallinity, then the support surface itself may act as the molecular sieve seed and deposited molecular sieve seeds may be dispensed with. Zeolite supports may however also be used in conjunction with a deposited molecular sieve seeds. Suitable supports include the composite membranes and layers manufactured according to U.S. Pat. Nos. 4,981,590 and 5,089,299.

It is preferred that the support is such that it is substantially inert under hydrothermal reaction conditions. It is preferred that substantially no chemical component of the support participates in the molecular sieve synthesis and, as a result, becomes incorporated within the structure of the crystalline molecular sieve layer. This is particularly advantageous when the crystalline molecular sieve layer is to function as a catalyst material or to act as the support for a catalyst material. In these circumstances, incorporation of unwanted chemical species into the structure of the crystalline molecular sieve layer may be detrimental to these functions. In addition, if the crystalline molecular sieve layer is to be used as a membrane, incorporation of unwanted chemical species from the support into the layer may adversely affect the permeation properties of the layer.

The support may be, and preferably is, cleaned prior to deposition of the molecular sieve seeds. Suitable cleaning techniques include ultrasonic treatment in water, pentane, acetone or methanol. This may be followed by a period of drying from a few minutes to 24 hours under ambient conditions or under temperatures up to 1000° C., preferably 500 to 700° C. The cleaning regime may comprise a combination of cleaning steps. Such a combination may be a series of washing steps with different solvents and/or drying steps. Each solvent washing step may be utilised in combination with ultrasound.

The molecular sieve seeds may be deposited, and preferably are deposited, as a discrete layer, or part of a discrete layer, which comprises molecular sieve seed crystals of average particle size 200 nm or less. Advantageously, the average crystal size of the molecular sieve seeds in the seed layer is 150 nm or less ideally within the range 5 to 120 nm and most preferably within the range 25 to 100.

The seed layer may consist substantially of molecular sieve material only, or it may be a composite layer of the molecular sieve seed material and intercalating material which may be organic or inorganic. The particles of the seed layer may be contiguous or non-contiguous; preferably they are contiguous. The intercalating material may be the same material as the support. The preferred molecular sieve seed crystals are colloidal in nature and capable of forming a stable colloidal suspension.

Colloidal molecular sieve seed crystals may be prepared by processes, which are well known in the art. Suitable processes are those described in International Applications; WO93/08125, WO97/03019 WO97/03020 WO97/03021 and WO94/05597, the disclosures of which, in so far as they refer to the manufacture of colloidal molecular sieve seeds, are incorporated by reference.

The molecular sieve seed may be applied to the support by techniques known in the art such as for example sol-gel coating techniques, spin-coating, wash-coating, spray-coating, brushing, slip-casting or dip-coating; these processes preferably being undertaken with a suspension of the colloidal molecular sieve crystals.

The colloidal molecular sieve seed crystals are preferably applied to the support by spin-coating; the viscosity of the mixture, the solids concentration and the spin rate inter alia controlling the coating thickness. The mixture may firstly be contacted with the stationary support, then after a short contact time the support is spun at the desired rate. Alternatively, the mixture is contacted with a support which is already spinning at the desired rate.

When present as a discrete layer, the thickness of the molecular sieve seed layer is advantageously 3 μm or less, more advantageously at most 2 μm, preferably 1 μm or less and most preferably 0.5 μm or less. Advantageously, the seed layer is of sufficient thickness to cover irregularities of comparable scale in the surface of the support. Advantageously, the seed layer is at most the thickness of the subsequently deposited crystalline molecular sieve layer.

In one embodiment the seed layer may be deposited and used as a monolayer. Such a monolayer and its method of deposition is described in WO97/33684, the disclosure of which in so far as it relates to the manufacture of a molecular sieve seed monolayer is incorporated by reference. It is preferred that the molecular sieve seed layer is one that has substantially a monolayer thickness. It is preferred that this monolayer is deposited via the charge reversal method utilising a cationic polymer as described in WO97/33684.

In one aspect of the process of the present invention the support may be impregnated and placed into the molecular sieve synthesis mixture without further treatment of the molecular sieve seed layer after its deposition. Even when submerged in the synthesis mixture, the particles in the seed layer remain adhered to the support and facilitate growth of the zeolite layer. However, under some circumstances, e.g. during stirring or agitation of the synthesis mixture, the adhesion between the molecular sieve seed layer and the support may be insufficient and steps may be taken to stabilise the seed layer.

Therefore, in another aspect of the invention, the molecular sieve seed layer is stabilised before impregnation or before being placed into the synthesis mixture. This stabilisation can be achieved in one aspect by heat-treating the seed layer, e.g. at temperatures between 30 and 1000° C., ideally greater than 50° C. and more preferably between 200° C. and 1000° C. and most preferably greater than 300°

C. and between 400° C. and 600° C., for several hours preferably at least two hours and most preferably 2 to 10 hours.

The impregnating material may be any material which substantially remains at its selected location within the support during subsequent process steps used for deposition of the crystalline molecular sieve layer e.g. hydrothermal synthesis conditions, and deposition of the molecular sieve seed layer if this occurs after impregnation, and which is substantially stable under such process condition, at least for the time scale of the process.

The impregnation material selected must remain substantially within the support, and must remain substantially stable, under the deposition conditions so as not to interfere with the deposition process and to ensure that a crystalline molecular sieve layer of the desired quality and properties is obtained in the process.

Ideally the impregnation material should have a viscosity which enables easy impregnation into the support. The properties of the impregnation material ideally are such that it may be impregnated into the support under capillary action, applied pressure or a vacuum. Furthermore, the impregnation material should be compatible with the physical properties of the support surfaces to ensure that it can wet the surfaces of the support and intimately contact with it.

Water and glycol are not suitable as impregnation material because they do not remain at any location in the support, selected for the impregnating material, under hydrothermal synthesis conditions.

The impregnation material should also be capable of being easily and substantially completely removed from the support after formation of the crystalline molecular sieve layer. Ideally at least the bulk of the impregnating material is capable of being removed under an applied pressure, by washing of the support with a suitable solvent, via calcination, via melting or any combination of these methods. It is preferred that the impregnation material is capable of being removed under calcination conditions which are normally used in the manufacture of molecular sieve materials such as those used in zeolite synthesis. It is important that the impregnation material can easily be removed in order to ensure that as little residual impregnation material as possible, and preferably no residual impregnation material, remains which could impair the performance of the crystalline molecular sieve layer.

The preferred impregnation materials include natural or synthetic organic resins e.g hydrocarbon resins. In the context of the present invention hydrocarbon means an organic material which has as its main components hydrogen and carbon but does not preclude the presence of one or more heteroatomic species e.g. oxygen or nitrogen or chlorine. One preferred class of impregnating material are the hydrocarbon resins which are free of heteroatoms. If a heteroatom is present it is preferred that it is oxygen or chlorine. Examples of suitable resins are acrylic resins, PVC resins and the hydrocarbon waxes.

Examples of suitable acrylic resins are the L R White Resins manufactured and supplied by the London Resin Co. These are hydrophilic acrylic resins of low viscosity (typically 8 mPa.s) which are commercially available in three grades of hardness; LR1280 hard grade, LR1281 medium grade and LR1282 soft grade. These resins may be thermally or cold cured, with or without the use of an accelerator such as LR1283.

Suitable hydrocarbon resins include for example the hydrocarbon waxes such as Exxon ESCOMER™ H101 and H231. H101 has a molecular weight within the range 1600 to 2300 and a viscosity at 121° C. of approximately 25.5 mPa.s, at 140° C. of approximately 17 mPa.s and at 190° C. of approximately 9 mPa.s. H231 has an approximate molecular weight of 6590 and a viscosity at 121° C. of approximately 600 mPa.s.

An example of a suitable impregnating material incorporating PVC is a PVC plastisol. Such plastisols are well known in the art and typically comprise PVC in combination with plasticizer, stabiliser and viscosity depressor.

Further examples of suitable impregnating materials are ethylene-butylene resins of approximate molecular weight 300 to 10000 or polyisobutylene resins of approximate molecular weight 500 to 5000.

The molecular sieve seed material may be deposited prior to or after impregnation of the support; preferably in one embodiment it is deposited prior to impregnation of the support. In this instance after impregnation of the support there may be quantities of impregnating material located on the surface of the molecular sieve seed layer, which has already been deposited on the support. If this layer of impregnating material is relatively thin or discontinuous then surprisingly it may not have an adverse effect on the seeding properties of the molecular sieve seed layer and need not be removed or if some removal is desired need not be completely removed. This is especially the case where the impregnating material is mildly unstable under the conditions used for subsequent deposition of the crystalline molecular sieve layer e.g. hydrothermal synthesis conditions, and is slowly dissolved in the synthesis mixture. Such a material, in accordance with the requirements of the process of the present invention, has acceptable stability. Examples of materials which have this property include, the hydrocarbon waxes, acrylic resins and ethylenelbutene resins described above. If necessary excess impregnation material may be removed from the surface of the molecular sieve seed layer by any suitable means. One suitable means, in the case where a co-solvent is used for impregnation, is to use the same solvent to clean the surface of the seed layer. When no co-solvent is used then any suitable solvent for the resin may be used to clean the seed layer surface. The thickness of this surface deposited layer of impregnation material should be less than 1 $\mu$m and preferably it should be less than 0.5 $\mu$m, and most preferably less than 0.1 $\mu$m The most preferred resins are the hydrocarbon wax resins which may easily impregnate the support and which are removed from the support under calcination temperatures that are normally used in zeolite synthesis, with or without prior melting of the bulk material.

Materials which have been found to be unsuitable as impregnating materials include some low molecular weight hydrocarbons e.g hexadecane, silicone oils and polyimide resins. This is believed to be mainly due to their propensity for relatively rapid removal from the support under the conditions used for deposition of the crystalline molecular sieve layer.

Any suitable impregnation material may be used alone or in combination with other impregnation materials and/or other materials which may be required to assist in their impregnation. For example PVC resins may advantageously be impregnated into the support as a solution in THF; the THF being evaporated prior to deposition of molecular sieve seed layer and/or crystalline molecular sieve layer. Other suitable solvents may be used in conjunction with the resins. The resins may be applied in the molten form under ambient pressure conditions or under an applied pressure; for example hydrocarbon waxes are advantageously applied in the molten form.

The impregnation stage may be and preferably is repeated one or more times to ensure that the pores of the support, which are at or proximate to the surface for deposition of the molecular sieve seed layer or crystalline molecular sieve layer, are substantially filled with impregnating material. Alternatively impregnation may be undertaken for extended periods of time to achieve the same result as repeated impregnation stages. In the case of hydrocarbon wax as impregnating material the impregnation time is typically in the order of 2 minutes or more at 150° C. under vacuum, ideally 2 to 5 minutes; for the same material an extended impregnation time is greater than 5 minutes and ideally in the order of 20 minutes or more under the similar conditions. Wax impregnation may usefully be, and preferably is, undertaken for one hour or more at 150° C. under an applied vacuum.

In one embodiment the support is impregnated through surfaces of the support other than the surface onto which the crystalline molecular sieve layer is to be deposited. For example a support in the form of a disk may be impregnated through one side only; the other side being the surface onto which the molecular sieve seed layer and crystalline molecular sieve layer are to be deposited. In one embodiment, the impregnation may be partial in order to fill the pores of the surfaces other than the surface onto which the crystalline molecular sieve layer is to be deposited. This partial filling of the pores of the support is acceptable if it results in improved performance of the crystalline molecular sieve layer compared to that manufactured without impregnation. Partial impregnation is particularly suitable when a molecular sieve seed layer is used and the crystalline molecular sieve layer is deposited via hydrothermal synthesis utilising a zeolite synthesis solution which comprises colloidal silica. Surprisingly the combination of a seed layer and colloidal silica in the synthesis solution, allows the use of partial impregnation. Impregnation may be continued until substantially all the pores of the support are impregnated including pores proximate to the surface of the molecular sieve seed. In the case of wax impregnation this may be observed visually by an optical change in the support and the degree of impregnation can be confirmed by cross-section SEM. In a further embodiment the support may be impregnated through the molecular sieve seed layer.

After impregnation the nature of the organic resin may be such that it is advantageous to cure the resin in-situ prior to use of the impregnated support in the manufacture of a crystalline molecular sieve layer. This curing ensures that the resin remains in the impregnated location during subsequent manufacture of the crystalline molecular sieve layer. Advantageously and preferably the impregnating material has a melting point at or above the temperature used in the process for manufacture of the crystalline molecular sieve layer. It is not essential that the impregnating material is or remains solid within the support during manufacture of the crystalline molecular sieve layer. It may become liquid or molten during this manufacture; this is acceptable if in this physical state the impregnating material meets the requirements described in detail above i.e. remains stable and in the desired location within the support.

In a further aspect of the present invention may utilise a further process step which is undertaken prior to impregnation of the porous support. When used in conjunction with impregnation this additional process step provides further control in the process and further improvements in performance and ease of manufacture. This further process step may be referred to as pre-impregnation masking and involves deposition of a removable coating onto the support surface which in due course will receive the crystalline molecular sieve layer. The pre-impregnation masking step enables a more accurate and effect impregnation stage to be undertaken. The pre-impregnation masking is applied to the appropriate surface of the porous support such that it does not impregnate the support or only impregnates, to a limited extent, the surface region of the support. After deposition of the pre-impregnation masking the support is then impregnated as described above, ideally so that the impregnating material comes into contact with or close proximity to the pre-impregnation masking. Once impregnation is completed the pre-impregnation masking may be removed and the remaining process steps undertaken in order to manufacture the crystalline molecular sieve layer.

The pre-impregnation masking may be applied before or after deposition of a molecular sieve seed layer on the support. When applied to a support which already has a molecular sieve seed layer deposited on its surface the pre-impregnation masking offers the additional benefit of protecting the molecular sieve seed layer surface from contamination with the impregnating material. When the pre-impregnation masking is applied to a support which does not have a seed layer deposited on its surface the seed layer is advantageously applied after removal of the pre-impregnation masking onto a high quality impregnated support. Of particular benefit is the use of such a high quality impregnated support with the monolayer seeding method described in WO97/33684. When this seeding method is used in conjunction with pre-impregnation masking good quality crystalline molecular sieve layers may be produced.

An important factor in pre-impregnation masking is to ensure that the material used for the masking is able to intimately contact the surface of the support and is compatible with the impregnating material and method of impregnation. If contact properties are inadequate impregnating material may fill spaces which arise between the pre-impregnation masking and the support; the resultant region of impregnating material on the support surface prevents subsequent deposition and growth of the crystalline molecular sieve layer and can thus lead to a poor quality layer.

The steps required for pre-impregnation masking include; cleaning of the support surface, coating the support surface with an appropriate masking material, impregnation of the masked support and removal of the masking material after impregnation.

The methods used to clean the support surface may be the same as those indicated above for preparation of the support for impregnation. A preferred method is to rinse the support in acetone and filtered ethanol (0.1 $\mu$m filter, Anotop™ Whatman) followed by drying.

The material used for the pre-impregnation masking may be any material which can be easily applied to the surface of the support and which may be readily removed after impregnation without significant disturbance to the impregnation material. The pre-impregnation masking material must be compatible with the surface of the porous support so as to effectively wet and coat substantially the whole of the desired region for masking. The choice of pre-impregnation masking material will also depend on the nature of the support e.g. its surface properties such as polarity. Examples of suitable pre-impregnation masking materials include organic polymers. Of particular interest for the masking of inorganic and asymmetric supports such as ceramics, in particular alpha-alumina, are polar polymeric materials such as the acrylic polymers and resins. A preferred masking material is polymethylmethacrylate (PMMA). An example of a suitable PMMA polymer is CM205 of MW 100,000 g/mole with a polydispersity of 1.8. An example of a polymer which is less suitable for use as a masking material with asymmetric alpha-alumina supports is polystyrene; it is believed that this is due to its relatively low polarity. Preferred organic polymers therefore have a polarity which is greater than that of polystyrene. The masking material may be applied in a number of ways. One method is to melt the organic polymer and to apply this to the surface of the support. A further and preferred method is to apply the organic polymer from solution in a suitable solvent for the polymer. In this context a true solution may not be formed and the solvent simply reduces the viscosity of the masking material for ease of application. A particularly useful solvent for PMMA is acetone. Preferably, the PMMA as masking material is applied as a solution of 1 part PMMA in 3.75 parts acetone. The solution of masking material is applied to the support and the deposited material is carefully dried to remove the solvent if used. Too rapid a drying process may lead to ineffective masking. In the case of PMMA applied via acetone the solvent is removed by drying at a rate of 1° C./h to 150° C. Impregnation of the masked support may be undertaken as described above.

After impregnation, the pre-impregnation masking material is removed. A suitable method for removal is washing with a suitable solvent. In the case of PMMA and other polar masking materials, a suitable solvent is acetone or the solvent that was used in the application of the mask. After solvent removal of the masking material the impregnated support surface that was in contact with the masking material may be further treated and preferably is further treated with an ammonia solution, ideally a 0.1M ammonia solution. After this treatment the impregnated support may be utilised for the deposition of a seeding layer, preferably using the monolayer technique, and deposition of a crystalline molecular sieve layer.

The composition of the synthesis solution is selected to provide the desired molecular sieve or molecular sieve type. When the crystalline molecular sieve layer comprises silicon in its framework then the $H_2O$ to $SiO_2$ ratio must be within the range of 7 to 100. Preferred silicon sources include tetraethylorthosilicate (TEOS) and colloidal silica when the support is partially impregnated. Preferably, the $H_2O$ to $SiO_2$ molar ratio in the synthesis mixture is within the range of 7 to 70, more preferably 7 to 60. For certain molecular sieves such as aluminophosphates (ALPO's) a source of silica is not required.

The composition of the synthesis mixture varies according to the process; the mixture always contains sources of the various components of the desired molecular sieve and usually contains a structure directing agent. A preferred colloidal silica source is an ammonia-stabilised colloidal silica, e.g., that available from du Pont under the trade mark Ludox AS-40.

The source of silicon may also be the source of potassium, in the form of potassium silicate. Such a silicate is conveniently in the form of an aqueous solution such, for example, as that sold by Aremco Products, Inc. under the trade mark CERAMA-BIND, which is available as a solution of pH 11.3, specific gravity 1.26, and viscosity 40 mPas. Other sources of silicon include, for example, silicic acid.

As other sources of potassium, when present, there may be mentioned potassium hydroxide. Whether or not the synthesis mixture contains a potassium source, it may also contain sodium hydroxide to give the desired alkalinity.

The structure directing agent, when present, may be any of those commonly used in zeolite synthesis. For the manufacture of an MFI layer, a tetrapropylammonium hydroxide or halide is advantageously used.

For the manufacture of an MFI type zeolite, especially ZSM-5 or silicalite-I, the synthesis mixture is advantageously of a molar composition, calculated in terms of oxides, within the ranges:

| | |
|---|---|
| $M_2O:SiO_2$ | 0 to 0.7 to :1 preferably 0 to 0.350:1, |
| $SiO_2:Al_2O_3$ | 12 to infinity :1 |
| $(TPA)_2O:SiO_2$ | 0 to 0.2:1 preferably 0 to 0.075:1 |
| $H_2O:SiO_2$ | 7 to 100:1 preferably 9 to 70:1 | wherein TPA represents tetrapropylammonium and M is an alkali metal, preferably sodium or potassium, although it may also be Li, Cs or ammonia. Other template agents may be used in these ratios. In the embodiment where pre-impregnation masking is not used its is most preferred that the $M_2O:SiO_2$ molar ratio is within the range 0.016 to 0.350:1, and preferably that the that the $H_2O:SiO_2$ molar ratio is within the range 7 to 60, more preferably 9 to 30:1, and most preferably 9 to 20:1.

In this specification ratios with infinity as the value indicate that one of the ratio materials is not present in the mixture.

The hydrothermal synthesis is preferably undertaken at a temperature of between 60 and 180° C. and for a period within the range 1 to 200 hours. In a preferred aspect the process of the present invention utilises a hydrothermal synthesis temperature of 140° C. or less, preferably within the range from 60 to 100° C., and most preferably within the range 60 to 90° C. When pre-impregnation masking is used the preferred temperature range is 60 to 100° C.

In a preferred aspect the process of the present invention utilises a synthesis time of 4 to 100 hours, in particular 4 to 80 hours and most preferably 4 to 36 hours. The time of reaction will vary depending on the temperature used during the hydrothermal synthesis and may be adjusted accordingly with shorter synthesis times generally being applicable when higher synthesis temperatures are used.

In the most preferred aspect of the process the hydrothermal synthesis temperature is approximately 90° C., the hydrothermal synthesis time is approximately 36 hours, and the $H_2O:SiO_2$ molar ratio in the synthesis mixture is within the range 9 to 20.

The hydrothermal treatment advantageously is undertaken in an autoclave under autogenous pressure. However, with synthesis temperatures below 100° C. it is possible to perform the synthesis under ambient pressure conditions.

After deposition of the crystalline molecular sieve layer the impregnating material is substantially completely removed by any of the methods or combination of methods indicated above. The removal method chosen will depend to some extent on the exact nature of the impregnating material. The essential requirement is that the removal method is capable of removing substantially all of the impregnated material. One suitable method is to utilise the final calcination step in the molecular sieve synthesis process to remove the impregnating material.

After crystallisation, the structure comprising the support and deposited crystalline molecular sieve layer with or without impregnating material may be washed, dried, and the crystalline molecular sieve calcined. The calcination conditions preferably comprise slow heating and cooling to ensure that the structure, and in particular the crystalline molecular sieve layer, remains intact with the minimum amount of cracking and/or delamination. Preferably, the structure is calcined at a temperature of 350 to 600° C., preferably 450 to 550° C. It is preferred that the structure is raised to the desired calcination temperature at a rate of 0.1 to 6° C. per minute most preferably 0.2 to 3° C. per minute.

In relation to the processes described herein contacting is to be understood to include immersion or partial immersion of the support in the relevant zeolite synthesis mixture.

The crystalline molecular sieve layer may be any known molecular sieve material; for example it may be a silicate, an aluminosilicate, an aluminophosphate (ALPO's), a silicoaluminophosphate, a metalloaluminophosphate, or a metalloaluminophosphosilicate.

The preferred molecular sieve will depend on the chosen application, e.g. separation, catalytic applications, and combined reaction and separation, and on the size of the molecules being treated. There are many known ways to tailor the properties of the molecular sieves, for example, structure type, chemical composition, ion-exchange, and activation procedures.

Representative examples are molecular sieves/zeolites which may be used in the molecular sieve layer include the structure types AFI, AEL, BEA, CHA, EUO, FAU, FER, KFI, LTA, LTL, MAZ, MOR, MEL, MTW, OFF, TON and, especially and preferably MFI.

The structure types of the molecular sieve seed and crystalline molecular sieve layers may be the same or different. Further, if the structure types are the same, the compositions may be the same or different. It is preferred that the molecular sieve seeds and the crystalline molecular sieve layer are both of the MFI structure type.

Some of the above materials while not being true zeolites are frequently referred to in the literature as such, and this term will be used broadly in this specification.

It is preferred that the hydrothermal synthesis stage of the process is undertaken under such conditions as to prevent the settling, on the forming crystalline molecular sieve layer, of particles produced within the synthesis mixture e.g. molecular sieve crystals which have homogeneously nucleated in the synthesis solution. Contacting of the support coated with molecular sieve seeds is advantageously carried out by immersion or partial immersion and with the support in an orientation and location in the synthesis mixture such that the influence of settling of crystals formed in the reaction mixture itself, rather than on the coated surface, is minimised. If support surface is three dimensional, e.g., a honeycomb, other means may be used to inhibit settling, for example, agitation, stirring or pumping.

The process of the present invention provides crystalline molecular sieve layers with good separation properties especially at high temperatures $\geq 250°$ C. and preferably $\geq 360°$ C. and/or hydrocarbon feed partial pressures in the feed of $\geq 50 \times 10^3$ Pa, preferably $\geq 100 \times 10^3$ Pa, most preferably at $500 \times 10^3$ Pa. Crystalline molecular sieve layers, especially when in the form of a membrane, have been characterised by means of a number of analytical techniques. One such technique is the dye permeation test as described in WO96/01683. Whilst this test is a good indication as to whether or not unacceptable defects are present in a crystalline molecular sieve layer, it is a coarse test and filter, and does not provide any absolute measurable difference which is quantifiable between different crystalline molecular sieve layers which pass the test; it is a pass or fail test. Crystalline molecular sieve layers have been further characterised using x-ray diffraction, transmission electron microscopy (TEM) and scanning electron microscopy (SEM). Such techniques have been used to characterise crystalline molecular sieve membranes in for example WO96/01683.

The crystalline molecular sieve layers of the present invention when characterised using the dye permeation test or SEM are indistinguishable from those crystalline molecular sieve layers described in WO96/01683. However, it has been found that the crystalline molecular sieve layers of the present invention exhibit different membrane properties, especially at high temperature and/or hydrocarbon partial pressure, compared to the prior art. It is possible to characterise the crystalline molecular sieve layers of the present invention using a simple membrane test which measures the transport characteristics, such as the selectivity and mass transport properties of the crystalline molecular sieve layer. This test enables the crystalline molecular sieve layers of the present invention to be distinguished from the prior art layers.

The test method is based on the evaluation of the selectivity and permeance of the crystalline molecular sieve layer arranged in the form of a membrane, using for example a mixture comprising para-xylene and meta-xylene or para-xylene and ortho-xylene; para-xylene and meta-xylene are particularly suitable to evaluate MFI molecular sieve membranes. The crystalline molecular sieve layer as a membrane is first analysed for its capacity to preferentially transport para-xylene from a mixture comprising para-xylene and meta-xylene on the feed side of the membrane to the permeate side of the membrane. The permeance of each isomer is measured simultaneously and the ratio of para-xylene to meta-xylene permeance provides a selectivity for para-xylene over meta-xylene. This parameter is dimensionless. The details of the test and calculations of selectivity and permeance are provided in the examples below.

It has been found that the crystalline molecular sieve layers of the present invention have good para-xylene over meta-xylene selectivity and permeance, especially at high temperatures and aromatic hydrocarbon partial pressures.

Accordingly the present invention also provides a crystalline molecular sieve layer having a selectivity ($\alpha_x$) for para-xylene over meta-xylene of 2 or greater and a permeance ($Q_x$) for para-xylene of $3.27 \times 10^{-8}$ mole(px)/m$^2$.s.Pa (px) (30 kg(px)/m$^2$.day.bar(px)) or greater measured at a temperature of $\geq 250°$ C. and an aromatic hydrocarbon partial pressure of $\geq 10 \times 10^3$ Pa.

The selectivity and permeance are calculated and determined as described below. The crystalline molecular sieve layers of the present invention are defined in terms of their selectivity and permeance properties for para-xylene separations. However, the present invention is not limited to crystalline molecular sieve layers only when used for para-xylene separations; the layers may be used for other separations and/or applications such as catalysts and sensors e.g. gas sensors. For $\alpha_x$ and $Q_x$ the subscipt x denotes the total aromatic hydrocarbon partial pressure in kpa on the feed side of the layer; thus x has a minimum value of 10 or greater, preferably 50 or greater, more preferably 100 or greater and most preferably 500 or greater. Ideally, x is within the range 10 to 1000, more preferably 100 to 1000, and most preferably 500 to 1000. Preferably the aromatic hydrocarbon partial pressure is $\geq 100 \times 10^3$ Pa, more preferably $\geq 500 \times 10^3$ Pa. Preferably, the temperature is $\geq 360°$ C. and most preferably $\geq 4000$, and ideally within the range 250° C. to 600° C., most preferably within the range 360° C. to 600° C. It is preferred for all layers of the present invention that the performance levels are attained in the presence of hydrogen.

It is preferred that the para-xylene over meta-xylene selectivity ($\alpha_x$) of the membrane layer is 2.5 or greater, more preferably 3 or greater, more preferably 5 or greater and most preferably 8 or greater. Ideally, it is within the range 2 to 30000, preferably 8 to 3000, and most preferably 8 to 100.

The para-xylene permeance ($Q_x$) is preferably $5.45\times10^{-8}$ mole(px)/m$^2$.s.Pa(px) (50 kg(px)/m$^2$.day.bar(px)) or greater, and more preferably $7.63\times10^{-8}$ mole(px)/m$^2$.s.Pa(px) (70 kg(px)/m$^2$.day.bar(px)) or greater. Ideally, it is within the range $3.27\times10^{-8}$ to $5.4\times10^{-6}$ mole(px)/m$^2$.s.Pa(px) (30 to 5000 kg(px)/m$^2$.day.bar(px)), more preferably within the range $7.63\times10^{-8}$ to $3.3\times10^{-6}$ mole(px)/m$^2$.s.Pa(px) (70 to 3000 kg(px)/m$^2$.day.bar(px)).

It will be appreciated that the structure comprising a crystalline molecular sieve layer and a support may be of any shape, and may be, for example, planar, cylindrical, especially cylindrical with a circular cross-section, or may be a honeycomb structure. For clarity, however, the following description will refer to the structure as if it were planar, and references will be made to the plane of a layer.

The products of the invention may additionally be characterised by X-Ray Diffraction (XRD) among other techniques. For this purpose a conventional X-Ray diffraction technique may be used, where the supported layered structure in the shape of a disk is mounted in a modified powder sample holder and a conventional θ/2θ scan is performed. The intensities of the zeolite reflections thus measured are compared to the intensities of reflections of a randomly oriented powder of a zeolite of the same structure and composition. If one or more sets of reflections related to one or more specific orientations of the crystal are significantly stronger than the remaining reflections as compared to the diffractogram of a randomly oriented powder, this indicates that the orientation distribution in the sample deviates from random. This is referred to as a crystallographic preferred orientation or CPO. It is preferred that the crystalline molecular sieve layers of the present invention are MFI structure type molecular sieves and exhibit a strong combined 011/101 reflection which is indicative of 011/101 CPO as measured by X-Ray Diffraction (XRD).

The thickness of the crystalline molecular sieve layer is advantageously less than 3 μm, more advantageously less than 2 μm, and preferably 1 μm or less most preferably 0.5 μm or less. Advantageously, the thickness of the layer, and the crystallite size of the crystalline molecular sieve, are such that the layer thickness is approximately the size of the longest edges of the crystals, giving essentially a monolayer. In such a monolayer the crystals are orientated such that the crystalline molecular sieve layer exhibits a columnar appearance when viewed in cross-section by SEM. In such a structure the majority of the inter-crystal grain boundaries are oriented substantially perpendicular to the plane which approximates to the interface between the support and crystalline molecular sieve layer. The crystalline molecular sieve layer contains substantially no crystals which are orientated such that the plane of their grain to grain interfaces are parallel to the support/crystalline molecular sieve layer interface; without wishing to be bound to any theory, the inventors believe that such interfacess may reduce the performance of the membrane.

It is preferred that the combined thickness of the molecular sieve seed layer and the crystalline molecular sieve layer is 3 μm or less, preferably 2 μm or less, and most preferably 1 μm or less.

Advantageously, in the hydrothermally deposited crystalline molecular sieve layer, the crystals are contiguous, i.e. substantially every crystal is in contact with one of its neighbours, although not necessarily in contact with one of its neighbours throughout its entire length.

Although it is desired that the crystalline molecular sieve layers of the present invention are crack free as determined by the dye test. It is acceptable to have cracks which may be reparated. It is also acceptable for the surface of the crystalline molecular sieve layer to exhibit a significant degree of surface cracking. It is surprising that although the crystalline molecular sieve layers of the present invention may exhibit an extensive surface cracked topography, they still exhibit good selectivity, and permeance even without the use of reparation techniques.

The crystalline molecular sieve layers of the present invention may be treated to further improve or stabilise their properties. In one aspect, whilst intact layer regions are of good quality, there may be regions of the layer which are cracked or where there may be pinholes present. If these cracks and pinholes are of such quantity and dimensions that they have a disproportionate effect on membrane performance then it is useful to reparate the layer. Suitable reparation techniques are described in for example WO96/01682, WO96/01686 and WO97/25129, the disclosures of which are incorporated by reference. The preferred method of reparation is that described in WO96/01686. If the crystalline molecular sieve layer of the present invention has no pinholes or cracks which disproportionately effect the layer performance it may still be advantageous to treat the crystalline molecular sieve layer to maintain its performance. In this context a suitable treatment is the selectivity enhancing layers described in WO96/01686. Such selectivity enhancing layers may at the same time also reparate defective crystalline molecular sieve layers. Such selectivity enhancing layers provide mechanical stability to the crystalline molecular sieve layers during use.

An alternative reparation method involves the use of a hydrolysed crystallisation solution. In this method a hydrolysed synthesis mixture, identical or similar to that used to deposit the crystalline molecular sieve layer, is applied to the surface of the crystalline molecular sieve layer on the support. Any suitable application method may be used; one such method is spin-coating at for example 8000 rpm. After deposition of the hydrolysed synthesis mixture the surface of the crystalline molecular sieve is further treated with an ammonia solution e.g. 0.1 M ammonia to clean the surface. The treated and ammonia cleaned crystalline molecular sieve layer is then exposed to moisture at elevated temperature, ideally in a closed autoclave at 100° C. for 24 hours. After exposure to moisture the crystalline molecular sieve is calcined. A suitable calcination regime is heating to 400° C. in air for 6 hours using a heat-up and cool-down rate of 2° C. per minute. This reparation method is particularly suitable for reparation of crystalline molecular sieve layers which have been manufactured using the pre-impregnation masking method.

When a membrane layer is reparated the end result is typically a modification of the selectivity and permeance properties of the layer. Typically there is a reduction in the permeance and an increase in the selectivity. It has surprisingly been found that when crystalline molecular sieve layers manufactured by the process of the present invention are reparated they possess high selectivity for para-xylene over meta-xylene and in addition retain acceptably good para-xylene permeance properties.

Accordingly the present invention in a further embodiment provides a reparated membrane comprising crystalline molecular sieve and having a selectivity ($\alpha_x$) for para-xylene over meta-xylene of 10 or greater and a permeance ($Q_x$) for para-xylene of $4.36\times10^{-9}$ mole(px)/m$^2$.s.Pa(px) (4 kg(px)/m$^2$.day.bar(px)) or greater measured at a temperature of $\geq250°$ C. and an aromatic hydrocarbon partial pressure of $\geq10\times10^3$ Pa.

Preferably, the reparated membrane layer has a para-xylene over meta-xylene selectivity ($\alpha_x$) of 12, most preferably 17 and ideally 60 or 100 or greater. Preferably, the selectivity is within the range 10 to 30000, more preferably 10 to 3000, and most preferably 10 to 200. The subscript x has the same values and ranges as indicated above for non-reparated membranes.

Preferably the reparated membrane layer has a para-xylene permeance ($Q_x$) of $5.12 \times 10^{-9}$ mole(px)/m$^2$.s.Pa(px) or greater (4.7 kg(px)/m$^2$.day.bar(px)), more preferably $7.08 \times 10^{-9}$ mole(px)/m$^2$.s.Pa(px) or greater (6.5 kg(px)/m$^2$.day.bar(px)) more preferably $8.1 \times 10^{-9}$ or greater, and most preferably $1.09 \times 10^{-8}$ mole(px)/m$^2$.s.Pa(px) or greater (10 kg(px)/m$^2$.day.bar(px)). Preferably the permeance is within the range of $6.54 \times 10^{-9}$ to $5.4 \times 10^{-6}$ mole(px)/m$^2$.s.Pa (px) (6 to 5000 kg(px)/m$^2$.day.bar(px)), and most preferably within the range $7.0 \times 10^{-9}$ to $3.3 \times 10^{-6}$ mole(px)/m$^2$.s.Pa (px).

In a further aspect the process of the present invention produces crystalline molecular sieve layers which may be characterised by a further aspect of their separations performance. It has been found that the selectivity of para-xylene over meta-xylene is not constant with time during use but surprisingly increases in a specific way, which is beneficial. This effect may be used to attain, maintain or improve the desired permeance and selectivity performance. Without being bound by any theory it is believed that these crystalline molecular sieve layers have a morphology and structure which lends itself to this effect. However, these morphology and structure differences cannot be distinguished from prior art crystalline molecular sieve layers due to the limitations of available analytical techniques. It is believed that these differences allow the crystalline molecular sieve layers of the present invention to preserve their selectivity performance during use and to allow this selectivity performance to be easily improved. When the crystalline molecular sieve layers manufactured by the process of the present invention are exposed to a mixed hydrocarbon stream e.g. an aromatics stream it is believed that some component or components of the stream reduce the detrimental effects of non-selective pathways through the crystalline molecular sieve layer whilst having little or no effect on the selective pathways. This is in effect a form of reparation which occurs during use of the crystalline molecular sieve layer and which may be controlled during use. As would be expected the permeance of individual components of the hydrocarbon mixture reduces with time of exposure. However, it is surprising that for some components the reduction is significantly more than for others. This selective reduction is believed to account for the improved selectivity. The reduction in permeance of key components is not detrimental to the overall performance of the crystalline molecular sieve layer if at the same time there is a consequential improvement in selectivity. The selectivity improvement is particularly noticeable for the separation of para-xylene from an aromatics stream. This effect may be observed by using the xylenes separation test described above to provide a plot of selectivity for the desired component e.g. para-xylene against time. This plot will show that the selectivity for para-xylene over meta-xylene increases with time. If this data plot is modified to express the first differential ($\Delta\alpha_{Px/Mx}/\Delta t$), (where $\alpha$=the selectivity for para-xylene over meta-xylene at a given time t), averaged over the first two hours of testing, then the value of this differential at t=2 is >0 i.e. it is increasing.

Thus the present invention in a further aspect provides a membrane comprising a crystalline molecular sieve layer, which membrane has a ($\Delta\alpha_{Px/Mx}/\Delta t$) at t=2 hours of greater than 0.

It has further been observed that as time of exposure to the hydrocarbon feed is extended then the selectivity either remains constant or may slowly and gradually decrease. It has been found that this effect may be prevented or reversed by controlling the hydrocarbon partial pressure in the feed to the crystalline molecular sieve layer during use. If the hydrocarbon partial pressure in the feed to the crystalline molecular sieve layer is increased this surprisingly has been found to improve the selectivity for selected components of the feed.

Accordingly in a further aspect the invention provides a process for enhancing the selectivity of a crystalline molecular sieve layer for the separation of at least one component from a hydrocarbon stream which process comprises:

a) exposing a crystalline molecular sieve layer to a hydrocarbon stream comprising at least two components under pressure for a period of time, such that at least one component is separated from the stream, and b) at some point in time during the exposure increasing the partial pressure of at least one component of the hydrocarbon stream.

The increase in hydrocarbon partial pressure, which increase is on the feed side of the crystalline molecular sieve layer, may be a gradual increase which occurs throughout the separation cycle or it may be a gradual increase for a proportion of the cycle or it may be a stepped increase in pressure or a combination of these. The increase in pressure may be applied one or more time during the process if desired. This process may be utilised to enhance the performance of crystalline molecular sieve layers so that they meet the desirable performance targets of a selectivity for para-xylene over meta-xylene of 2 or greater and a permeance for para-xylene of $3.27 \times 10^{-8}$ mole(px)/m$^2$.s.Pa(px) (30 kg(px)/m$^2$.day.bar(px)) or greater at a temperature of $\geq 250°$ C. and an aromatic hydrocarbon partial pressure of $\geq 10 \times 10^3$ Pa.

The preferred crystalline molecular sieve layers for use in this process are those prepared by the process described above for the manufacture of crystalline molecular sieve layers.

The preferred hydrocarbon stream is an aromatics stream and most preferably is an aromatics stream which comprises a mixture of xylenes with other aromatic components.

Processes suitable for operation in accordance with this aspect of the invention are described in for example WO93/08125, WO97/03019 WO97/03020 WO97/03021 and WO94/05597 and as described below.

The invention also provides a structure in which the support, especially a porous support, has crystalline molecular sieve layers according to the invention on each side, the layers on the two sides being the same or different; it is also within the scope of the invention to provide a layer not in accordance with the invention on one side of the support, or to incorporate other materials in the support if it is porous.

A catalytic function may be imparted to the crystalline molecular sieve layers of the invention either by bonding of a catalyst to the support or the free surface of the crystalline molecular sieve layer, or its location within a tube or honeycomb formed of the structure, by its incorporation in the support, e.g., by forming the support from a mixture of support-forming and catalytic site-forming materials or in the seed layer or crystalline molecular sieve layer itself. If the support is porous a catalyst may be incorporated into the pores, the catalyst optionally being a zeolite. For certain applications, it suffices for the structure of the invention to be in close proximity to, or in contact with, a catalyst, e.g. in particulate form on a face of the structure.

The crystalline molecular sieve layer may be configured as a membrane, a term used herein to describe a barrier having separation properties, for separation of fluid (gaseous, liquid, or mixed) mixtures, for example, separation of a feed for a reaction from a feedstock mixture, or in catalytic applications, which may if desired combine catalysed conversion of a reactant or reactants and separation of reaction products. The crystalline molecular sieve layer may be removed from the support on which it is formed for use as a membrane or catalyst. This may be achieved by methods known in the art including for example dissolution of the support. It is preferred that the crystalline molecular sieve layers of the present invention are supported on a porous support in use ideally the support used for their manufacture.

Conversions which may be effected include isomerizations, e.g., of alkanes and alkenes, conversion of methanol or naphtha to alkenes, hydrogenation, dehydrogenation, e.g., of alkanes, for example propane to propylene, oxidation, catalytic reforming or cracking and thermal cracking.

The present invention accordingly also provides a process for the separation of a fluid mixture which comprises contacting the mixture with one face of a structure according to the invention in the form of a membrane under conditions such that at least one component of the mixture has a different steady state permeability through the structure from that of another component and recovering a component of mixture of components from the other face of the structure.

The present invention accordingly also provides a process for the separation of a fluid mixture which comprises contacting the mixture with a structure according to the invention in one embodiment in the form of a membrane under conditions such that at least one component of the mixture is removed from the mixture by adsorption. Optionally the adsorbed component is recovered and used in a chemical reaction or may be reacted as an adsorbed species on the structure according to the invention.

The invention further provides such processes for catalysing a chemical reaction in which the structure is in close proximity or in contact with a catalyst.

The invention further provides a process for catalysing a chemical reaction which comprises contacting a feedstock with a structure according to the invention which is in active catalytic form under catalytic conversion conditions and recovering a composition comprising at least one conversion product.

The invention further provides a process for catalysing a chemical reaction which comprises contacting a feedstock with one face of a structure according to the invention, that is in the form of a membrane and in active catalytic form, under catalytic conversion conditions, and recovering from an opposite face of the structure at least one conversion product, advantageously in a concentration differing from its equilibrium concentration in the reaction mixture.

The invention further provides a process for catalysing a chemical reaction which comprises contacting a feedstock with one face of a structure according to the invention that is in the form of a membrane under conditions such that, at least one component of said feedstock is removed from the feedstock through the structure to contact a catalyst on the opposite side of the structure under catalytic conversion conditions.

The invention further provides a process for catalysing a chemical reaction which comprises contacting one reactant of a bimolecular reaction with one face of a structure according to the invention, that is in the form of a membrane and in active catalytic form, under catalytic conversion conditions, and controlling the addition of a second reactant by diffusion from the opposite face of the structure in order to more precisely control reaction conditions. Examples include: controlling ethylene, propylene or hydrogen addition to benzene in the formation of ethylbenzene, cumene or cyclohexane respectively.

The crystalline molecular sieve layers of the present invention have particular utility in the separation of paraxylene from mixtures comprising paraxylene and at least one other isomer of xylene. Accordingly the present invention also provides a process for the separation of para-xylene from a mixture comprising para-xylene and at least one other isomer of xylene, which process comprises exposing the mixture to a crystalline molecular sieve layer according to the present invention at a temperature of $\geq 250°$ C. and an aromatic feed partial pressure of $\geq 10 \times 10^3$ Pa. In this embodiment the aromatic feed is a feed which comprises isomers of xylene optionally with other aromatic hydrocarbons e.g. ethylbenzene. Alternative pressures and temperatures as indicated above in respect of the crystalline molecular sieve layers may also be used in this process.

The following Examples, in which parts are by weight unless indicated otherwise, illustrate the invention:

EXAMPLES 1 to 4

Preparation of Alumina Porous Support

Porous alumina supports were cleaned as follows:
1. Ultrasonicate in water for 10 minutes.
2. Heat treat in air overnight at 700° C.
3. Ultrasonicate in pentane for 10 mins.
4. Remove and dry in air for 10 minutes.
5. Ultrasonicate in acetone for 10 minutes.
6. Remove and dry in air for 10 minutes.
7. Ultrasonicate in methanol for 10 minutes.
8. Remove and dry for approximately 2 hours at 110° C. and cool to room temperature.

Preparation of Colloidal Seeds

Silicalite colloidal seeds of ~50 nm particle size were prepared according to the general method as described in WO93/08125.

Deposition of Seed Layer

The colloidal seeds were deposited on the cleansed alumina supports by spin-coating, a colloidal suspension of 0.5% by weight of ~50 nm sized MFI crystals with a pure silica composition and as prepared above.

A porous alpha-alumina disk of diameter 25 mm, thickness 3 mm, pore size 80 nm, and ~33% porosity by volume, was machined and polished on one face. The disk was then placed in the specimen chuck of a CONVAC Model MTS-4 spinner and brought up to a spinning speed of 4000 rpm. Once this spinning speed had been reached 2 ml of the seed solution was applied to the centre of the disk and spinning was continued to a total of 30 seconds. The coated disk was placed in an oven and heated up to a temperature of 425° C. or 450° C. at a heat-up rate of 0.3° C./min and held at the terminal temperature for 6 hours. After 6 hours the coated disk was cooled at a rate of 0.5° C./min until the disk reached room temperature.

Impregnation

A petri dish was partially filled with H101 hydrocarbon wax, which had been melted at 150° C. in a vacuum oven. The porous support, with seed layer deposited thereon, was placed on a holder in the wax filled petri dish such that only the surface of the support which was free of deposited seeds was submerged in the wax. This ensured that the seed layer did not come into contact with the wax. The vacuum pump was switched on and after 2 minutes it was switched off at a vacuum of <50 mbar. The oven was brought to atmospheric pressure and the impregnated wax was allowed to crystallise within the pores of the support. This impregnated support was now ready for deposition of a crystalline molecular sieve layer.

Preparation of Hydrothermal Synthesis Solutions

A solution was prepared of 0.92 g NaOH (98.4% purity) in 138.14 g of water. Into this solution was dissolved 7.12 g of tetrapropylammonium bromide (TPABr: Fluka). To this mixture was added 76.66 g of colloidal silica solution (Ludox AS 40, supplied by Du Pont) and the resulting mixture was stirred with a magnetic stirrer for 2 to 10 minutes. The resulting molar composition was as follows:

0.22 $Na_2O$:0.52 TPABr:10 $SiO_2$:200 $H_2O$

Hydrothermal Synthesis

The impregnated support with seed coating was mounted in a holder with the spin-coated face pointing downwards, near the surface of the synthesis mixture in an autoclave. The autoclave was closed, placed in an oven, and heated during 30 minutes to the crystallisation temperature and maintained at that temperature for the period specified in the following Table. The oven was then allowed to cool to room temperature. After cooling, the disk was removed and washed in demineralized water until the conductivity of the last washing water was $\leq 5$ µS/cm. The disk was then dried in an oven at 125° C. After drying the resulting structure was calcined and tested for para-xylene separations performance. The calcination conditions were sufficient to remove substantially all the impregnating material.

Selectivity Enhancing Coating

One crystalline molecular sieve layer was treated using the procedure described in Example 3 of WO96/01686 to provide a selectivity enhancing layer on the crystalline molecular sieve layer. The resulting structure was also tested for para-xylene separation performance.

Para-xylene Separation Test

Figure 1:
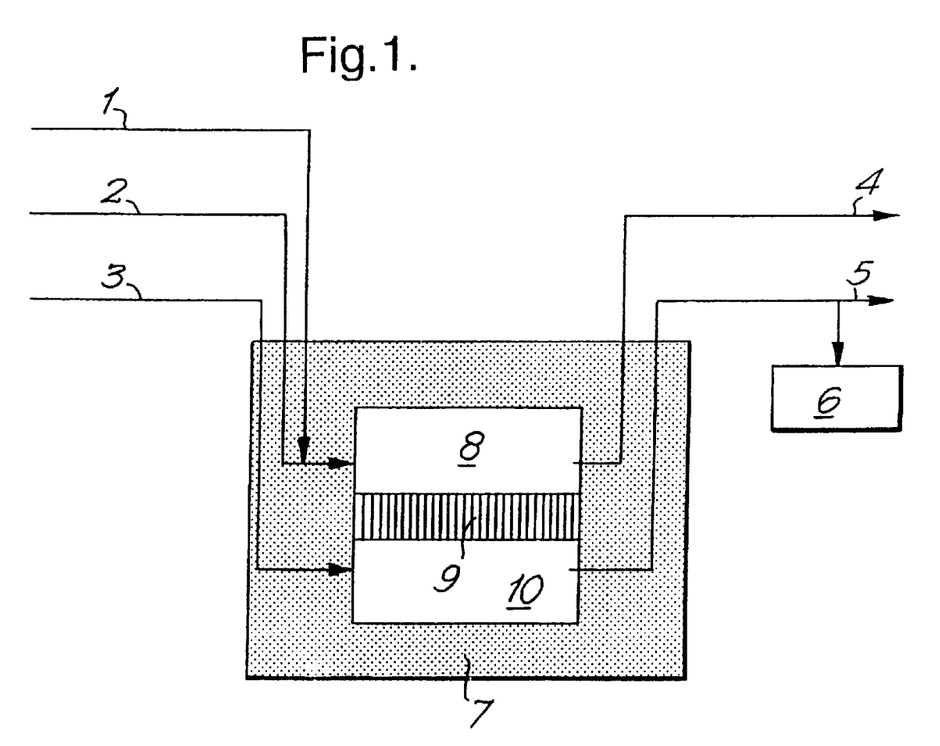

A simplified diagram of a unit used to test the crystalline molecular sieve membrane layers is shown in FIG. 1. Hydrogen feed (1) and aromatics feed (2), are mixed, preheated and vaporised inside a sand bath (7). A hydrogen sweep (3) is also preheated in the sand bath (7). The hydrogen feed (1) combined with aromatics feed (2) flow into the feed side (8) of a stainless steel cell (11) containing the crystalline molecular sieve layer on a porous support (9). The hydrogen sweep (3) flows into the same stainless steel cell but into the sweep side (10). This cell is designed such that selected components from the aromatics feed pass through the membrane from the feed side into the sweep side at process conditions. A product stream labelled retentate (4), which is the feed depleted of select components, and permeate (5), which is the sweep enriched with selected components from the feed, separately, but simultaneously, flow out of the stainless steel cell. The permeate (5) is analysed by an on-line chromatograph (GC) (6), and the composition of the permeate is used in conjunction with the permeate flow to calculate the flow of each individual component through the membrane.

Following is a detailed description of the testing procedure.

1. A molecular sieve membrane on a porous support is mounted into a metal (steel) cell and sealed with a graphoil o-ring. It is preferable to have the surface of the steel cell passivated so that it does not induce catalytic cracking and coking reactions in the test. The catalytic activity of the cell and the membrane assembly can be assessed by measuring the level of cracking products in the permeate. It is also preferable to pretreat the graphoil o-ring so that it does not outgass carbonaceous materials which have the potential of fouling the membrane and reducing observed xylenes flows through the membrane. One procedure for pretreating graphoil o-rings is by heating up under air at 450° C. for 3 h followed by cooling to room temperature. It should be noted that the graphoil o-ring is applied directly to the zeolite layer or any selectivity-enhancing coating or reparation layer if applied.

2. The cell with the membrane mounted inside is then heated to a temperature of at least 250° C. and ideally between 360 and 400° C. A suitable heating rate is ~2° C./min. While the membrane is being heated, hydrogen is flowed across the feed and sweep side of the membrane. Flow rates for tests with a ~2.5 cm diameter membrane sealed with a graphoil gasket which exposes an area of 2.91 $cm^2$ to the feed are:

100 ml/min at $100 \times 10^3$ Pa absolute on the feed side 100 ml/min at $100 \times 10^3$ absolute on the sweep side It should be noted that the feed side is the side of the membrane structure sealed by the graphoil gasket (i.e., the side on which the crystalline molecular sieve layer is deposited). In this steady state there is no Δp across the membrane.

For the ~2.5 cm diameter membrane, a liquid hydrocarbon mixture which, is inter alia composed of para-xylene and meta-xylene isomers is introduced at a rate of 33 ml/h into the hydrogen flowing on the feed side of the membrane. The line carrying the mixture to the cell passes through a hot zone in order to ensure that the feed is vaporised and to bring the mixture to the temperature at which the test is to be conducted. The pressure on the feed side is then increased by at least $50 \times 10^3$ Pa, ideally at least $100 \times 10^3$ Pa absolute. This provides a Δp across the membrane of at least $50 \times 10^3$ Pa and ideally at least $100 \times 10^3$ Pa.

At the testing temperatures, the hydrogen partial pressure on the feed side is approximately equal to the hydrogen partial pressure in the flowing hydrogen sweep stream. With this testing procedure, hydrogen transference through the membrane is minimised and there is said to be hydrogen balance.

The composition of the aromatic hydrocarbon mixture used in the examples was nominally 70% meta-xylene (mX), 20% para-xylene (pX), 5% ethylbenzene (EB), and 5% trimethyl-benzene (TMB) by weight; variation in this composition is acceptable. In the context of the present invention reference to aromatic hydrocarbon partial pressure is to the partial pressure of a mixture of meta-xylene (mX), para-xylene (pX), ethylbenzene (EB), and trimethyl-benzene (TMB). It is preferable that the oxygen level in these mixtures be low to prevent chemical reactions which can lead to coking. This can be done by degassing the mixtures, or by formulating the mixtures from oxygen free solvents.

The composition of the hydrocarbons in the permeate stream is measured with an FID detector in a gas chromatograph. The integrated area for each component is used to deduce the flux of each component; the integrated area can be related to the mass fraction of a component in the permeate by a calibration procedure in which a known concentration of mixture components is passed through the gas chromatograph.

Figure 2A:
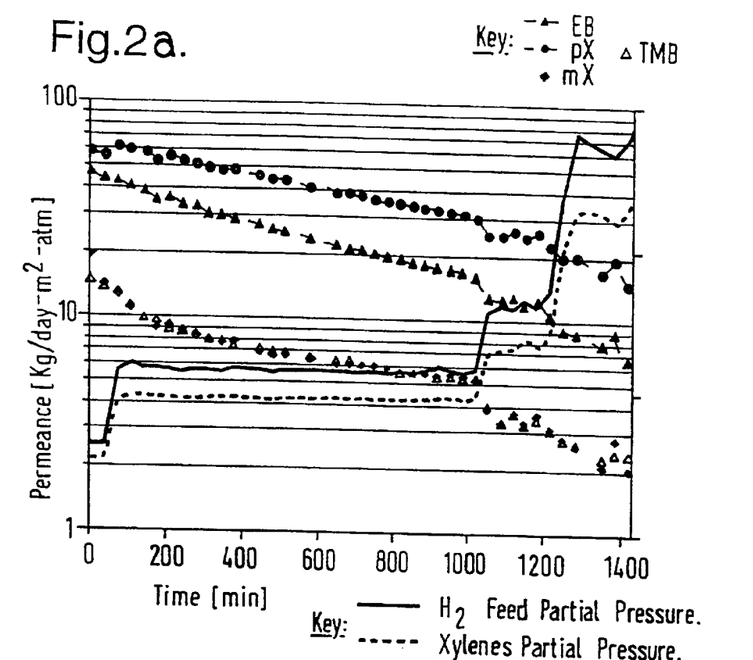
Figure 2B:
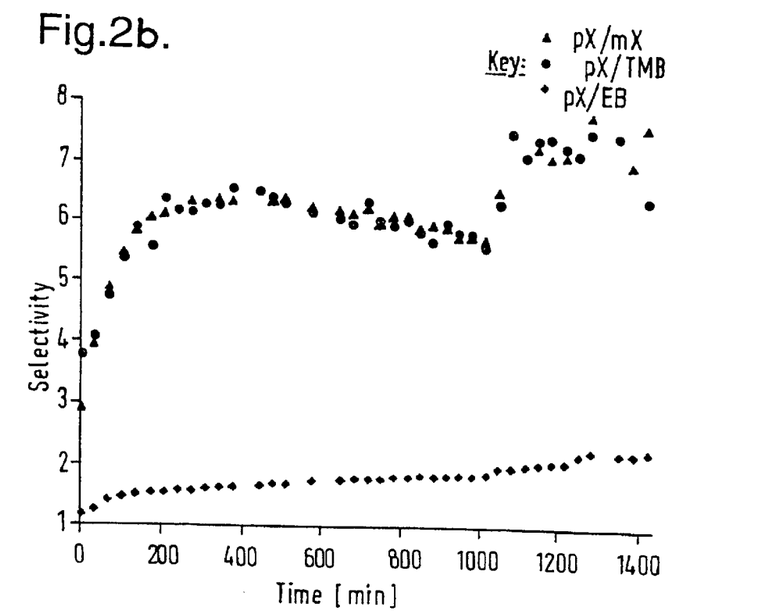

The values selected for characterising the membrane may be taken at a number of pressures and temperatures. Any membrane when tested at a temperature of at least 250° C. and a pressure of at least $10 \times 10^3$ Pa, which has the required permeance and selectivity is a membrane according to the present invention. The performance of the membrane is monitored with time. The test reading may be taken at any time after the membrane is at the required temperature and pressure and after introduction of the hydrocarbon feed. It may be desirable to delay the reading until the membranes selectivity properties are relatively stable. The performance readings are taken as the maximum values for Q and α attained during the test. As indicated above membranes prepared according to the process of the present invention may exhibit an improvement in selectivity properties during the initial stages of use; these improvements can be rapid or may take extended periods of time to stabilise. This effect is referred to as selectivation. This initial increase in performance followed by a period of relative stability is illustrated in FIG. 2(b), which shows the selectivity properties beginning to plateau after approximately 6 hours. This effect may not be observed with reparated membranes. The maximum performance values for these membranes may occur at the start of the test; performance values for these membranes are typically taken early in the test in the first few hours of testing. The exact point in time at which the test reading is taken will therefore vary with the temperature and test pressures used. What is important is that the test result is taken at the maximum performance values and in the case of membranes which exhibit selectivation, when the maximum plateau is reached. Ideally this test result is taken at least 1 hour after introduction of the hydrocarbon feed. In these experiments, the test readings were taken at various times between 1 to 20 hours after introduction of the hydrocarbon feed. For the reparated membrane the test result was taken at 1 hour. Hydrogen flow rates are measured in permeate and retentate. It is preferred that the performance of the membranes is achieved at hydrogen balance.

The permeance of hydrocarbon component A is calculated as follows:

$$\text{Permeance of } A = \frac{\text{Mass Flow Rate of } A \text{ in Permeate}}{(\text{Partial Pressure of } A \text{ in Feed-Partial Pressure of } A \text{ in Sweep}) * \text{Area}}$$

Area=Membrane area exposed to feed by graphoil gasket

Permeance is expressed in SI units as $\text{mole(px)/m}^2\text{.s.Pa(px)}$ where mole(px) refers to moles of para-xylene, and Pa(px) refers to the paraxylene partial pressure in Pa (an example of a non-SI unit often used in industry is $\text{kg(px)/m}^2\text{.day.bar(px)}$ which is equal to $1.09 \times 10^{-9}$ $\text{mole(px)/m}^2\text{.s.Pa(px)}$).

Under certain circumstances, the transfer of hydrocarbons through the membrane from feed to sweep is low enough that the partial pressure of hydrocarbons in the sweep is negligible (note that hydrocarbons are not added to the sweep so any hydrocarbons present in the permeate must flow through the membrane). In such circumstances, one may opt to neglect the partial pressure of hydrocarbon A in the sweep and calculate the permeance of A using the partial pressure of hydrocarbon A in the feed as the total transmembrane pressure driving force. The error in such approximation is equal to the ratio of the partial pressure of A in the sweep to the partial pressure of A in the feed. Thus, it follows that if the partial pressure of A in the sweep is much lower than the partial pressure of A in the feed, the error is low. Using the flow rates given here to test the membranes described in this invention, the partial pressure of each hydrocarbon in the sweep is less than five percent of the partial pressure of the same hydrocarbon in the feed. This is the result of having deliberately set the flow rates to attain low transfer of hydrocarbons from feed to sweep during testing. The total transfer of hydrocarbons from feed to sweep was kept at less than five percent the amount of hydrocarbons in the feed. It is preferable that this amount be less than one percent of the amount of hydrocarbons in the feed. Under these conditions, the partial pressure of hydrocarbons in the sweep were neglected in the calculation of permeance, and the permeances reported here were calculated using the partial pressure of hydrocarbons in the feed as the total transmembrane pressure driving force. The results are quoted as $Q_x$ ($Q_x$=pXy permeance in mole(px)/$\text{m}^2\text{.s.Pa(px)}$ and $\alpha_x$ ($\alpha_x$=pXy/mXy selectivity) with x indicating the total aromatic hydrocarbon partial pressure in kPa. The test parameters used in these experiments are as indicated below:

$Q_{100}$ and $\alpha_{100}$

For Examples 1 to 3 these values were measured under the following conditions:

| | |
|---|---|
| Temperature | = 360° C. |
| Feed rate | =≥ 100 ml/min |
| Sweep rate | =≥ 100 ml/min |

The composition of feed and sweep gases, in kPa partial pressure of the gases was as follows:

| Feed/Sweep | Component of Composition | Partial Pressure kPa | Comments |
|---|---|---|---|
| Feed | para-xylene | 25 | Total aromatic hydrocarbon |
| | meta-xylene | 65 | partial pressure = 100 kPa |

-continued

| Feed/Sweep | Component of Composition | Partial Pressure kPa | Comments |
|---|---|---|---|
| | ethyl-benzene | 5 | |
| | tri-methyl-benzene | 5 | |
| | Hydrogen | 100 | no net flow of $H_2$ from feed |
| Sweep | Hydrogen | 100 | to sweep or vice versa |

For Example 4 these values were measured under the following conditions:

| Temperature | = 400° C. |
| --- | --- |
| Hydrogen Feed rate | =≧ 120 ml/min |
| Sweep rate | =≧ 200 ml/min |

The composition of feed and sweep gases, in kPa partial pressure of the gases was as follows:

| Feed/Sweep | Component of Composition | Partial Pressure kPa | Comments |
| --- | --- | --- | --- |
| Feed | para-xylene | 20 | Total aromatic hydrocarbon partial pressure = 100 kPa |
|  | meta-xylene | 70 |  |
|  | ethyl-benzene | 5 |  |
|  | tri-methyl-benzene | 5 |  |
|  | hydrogen | 120 | no net flow of $H_2$ from feed to sweep or vice versa |
| Sweep | hydrogen | 115 |  |

$Q_{500}$ and $\alpha_{500}$

These values were measured under the following conditions:

| Temperature | = 360–400° C. |
| --- | --- |
| Feed rate | =≧ 200 ml/min |
| Sweep rate | =≧ 200 ml/min |

The composition of feed and sweep gases, in kPa partial pressure of the gases:

| Feed/Sweep | Component of Composition | Partial Pressure kPa | Comments |
| --- | --- | --- | --- |
| Feed | para-xylene | 125 | total aromatic hydrocarbon partial pressure = 500 kPa |
|  | meta-xylene | 325 |  |
|  | ethyl-benzene | 25 |  |
|  | tri-methyl-benzene | 25 |  |
|  | hydrogen | 1200 | no net flow of $H_2$ from feed to sweep or vice versa |
| Sweep | hydrogen | 1200 |  |

It must also be pointed out that because of the low total transfer of hydrocarbons from feed to sweep, the partial pressure of hydrocarbons in the feed is constant across the membrane surface. Because of this and the fact that the partial pressures of hydrocarbons in the sweep are negligible and uniform across the sweep side of the membrane, the partial pressure difference of each hydrocarbon across the membrane is constant across the entire membrane area. Therefore, the permeances reported here are considered point permeances to distinguish them from permeances one can observe in large-area membranes where the concentrations in both feed and sweep sides are allowed to vary across the total membrane area (i.e., the transmembrane pressure difference varies across the membrane area). Such is the case of a large membrane module, where, if one applies the equation of permeance as written, the permeance obtained would be an average permeance in the membrane module. One may refer to this permeance as an integrated or module permeance which would be different than the point permeances provided here. The importance of differentiating between a point permeance and an average or module permeance is that a point permeance is the parameter one must use in engineering the design of a membrane module. An average or module permeance, on the other hand, only applies to that specific membrane module under the testing conditions used.

The selectivity of a component A over a component B is calculated as follows:

$$\text{Selectivity} \frac{A}{B} = \frac{\text{Permeance of } A}{\text{Permenace of } B}$$

The selectivities and permeance values for the layers according to the present invention are provided in Table 1.

Examples 1 and 2 illustrate the effect of the additional step of reparation in the process of the present invention. Example 2 is reparated and exhibits exceptionally high selectivity for para-xylene over meta-xylene whilst maintaining an acceptable permeance. The additional examples illustrate the good selectivities and permeances observed with the layers of the present invention.

Supported crystalline molecular sieve layers prepared as described above were monitored for the separation performance with time. FIGS. 2(a) and 2(b) illustrate the results. FIG. 2(a) shows that after the initial period of stabilisation with time, the permeances of the components through the layer reduces with exposure to the feed. In FIG. 2(a) a stepped increase in the feed partial pressure for hydrogen and for the xylenes components of the feed is identified at 1000 minutes of exposure. In FIG. 2(b) it can bee seen that this stepped increase in partial pressure has provided a stepped increase in selectivity for para-xylene over meta-xylene and trimethylbenzene. In addition FIG. 2(b) illustrates a surprising improvement in the selectivity of the layer to para-xylene during use.

TABLE 1

| Example | Test Temp ° C. | Time on oil hours | Seed Layer Thickness μm | Molecular Sieve Layer Thickness μm | Combined Thickness μm | $Q_x \cdot 10^{-8}$ $\text{mole}_{px}/m^2 \cdot s \cdot Pa_{px}$ | $\alpha_x$ | Comments |
| --- | --- | --- | --- | --- | --- | --- | --- | --- |
| 1 | 360 | 6 | 0.5 | 0.5 | 1 | $Q_{100}$ = 5.8 | $\alpha_{100}$ = 3.2 | Selectivation |
| 2 | 360 | 1 | 0.5 | 0.5 | 1 | $Q_{100}$ = 0.81 | $\alpha_{100}$ = 103 | No Selectivation |
| 3 | 360 | 6 | 0.5 | 0.5 | 1 | $Q_{100}$ = 5.8 | $\alpha_{100}$ = 2.8 | Selectivation |
| 4 | 400 | 6 | 0.5 | 0.5 | 1 | $Q_{100}$ = 9.6 | $\alpha_{100}$ = 5.4 | Selectivation |

EXAMPLE 5

Support Cleaning

An α-alumina disk, 2.5 mm diameter, 3 mm thickness, with bulk 3 μm pore size, and several intermediate layers, with a top layer of 100 nm pore size (available from Inocermic GmbH, Hermsdorf, Germany) was cleaned by rinsing in acetone and filtered ethanol (0.1 μm filter, Anotop™, Whatman) and dried.

Pre-impregnation Masking

A solution of 1 part by weight PMMA (polymethylmetacrylate distributed by Polykemi AB, Ystad, Sweden as CM 205, MW 100,000 g/mole, polydispersity 1.8) in 3.75 parts by weight acetone, was passed through a 0.1 μm pore filter (Anotop™, Whatman), and was brought onto the top surface of the support by using a syringe, filter and needle. The deposited solution was then carefully dried by first drying at room temperature overnight and then heating with a rate of 1° C./h to 150° C.

Support Impregnation

Hydrocarbon wax (H101 wax) was impregnated from the back of the masked support support for 1 hour at 150° C. under an applied vacuum.

Removal of Pre-impregnation Masking

After impregnation the PMMA coating was removed by washing in acetone, ethanol and the support was then washed with a filtered (0.1 μm filter, Anotop™, Whatman) 0.1 M ammonia solution.

Deposition of Molecular Sieve Seeds

The impregnated support was soaked in a 0.4% aqueous cationic polymer solution (Redifloc 4150, Eka Nobel AB, Sweden pH adjusted to 8.0 by the addition of ammonia) which was prepared from distilled and filtered (0.1 μm filter, Anotop™, Whatman) water and filtered through a 0.8 μm filter (Acrodisc™, Pall) immediately before use. The soaking time was 10 minutes. The support was subsequently rinsed 4 times with a filtered (0.1 μm filter, Anotop™, Whatman) 0.1 M ammonia solution. The support was immersed for 10 minutes in a sol containing 1% ~60 nm silicalite-1 crystals. The pH of the sol was 10.0. The support was subsequently rinsed 4 times with a filtered (0.1 μm filter, Anotop™, Whatman) 0.1 M ammonia solution.

Hydrothermal Synthesis

The seeded supports were treated in a hydrolyzed synthesis mixture with the molar composition 3TPAOH:25SiO$_2$:1500H$_2$O:100EtOH which was heated during 30 h in silicone oil at a temperature of 100° C. After cooling, the membrane was rinsed in 0.1 M ammonia solution. The resultant membrane was calcined.

The calcined membrane showed the following performance when tested as above but without hydrogen balance, and averaged over t=1–2 hours and a sweep flow of 200 ml/min:

$Q_{100}$=1.1×10$^{-7}$ mole/m$^2$.s.Pa (102 kg(px)/m$^2$.day.bar (px))

$\alpha_{100}$=13.2

The test was then continued at higher pressure, and the system was adjusted to obtain hydrogen balance which was obtained at 19.5 hours; the performance averaged over t=19.5–20.5 hours was:

$Q_{500}$=2.75×10$^{-8}$ mole/m$^2$.s.Pa (25 kg(px)/m$^2$.day.bar (px))

$\alpha_{500}$=4.8

EXAMPLE 6

A membrane was prepared as in the Example 10, with the exception that the crystallization time was 72 hours Reparation of Membrane A hydrolyzed synthesis mixture, as used for crystallizing the layer (see Example 10), was applied to the disk by spincoating at 8000 rpm. While still spinning, the surface was cleaned using 0.1 M ammonia. The treated membrane was put on a holder above the liquid level in a 65 ml autoclave containing 10 ml water. The closed autoclave was held at 100° C. for 24 hours.

The treated membrane was held at 400° C. in air for 6 hours, heat-up and cool-down rate was 2° C./minute The resulting membrane showed the following performance after 2 hours exposure to the hydrocarbon stream:

$Q_{100}$=1.06×10$^{-7}$ mole/m$^2$.s.Pa (97 kg(px)/m$^2$.day.bar (px))

$\alpha_{100}$=17.4

This membrane did not show selectivation.

What is claimed is:

1. A crystalline molecular sieve layer having a selectivity ($\alpha_x$) for para-xylene over meta-xylene of 2 or greater and a permeance ($Q_x$) for para-xylene of 3.27×10$^{-8}$ mole(px)/m$^2$.s.Pa(px) or greater measured at a temperature of $\geq$250° C. and an aromatic hydrocarbon partial pressure of $\geq$10×10$^3$ Pa.

2. A crystalline molecular sieve layer as claimed in claim 1 wherein the molecular sieve layer is carried on a porous support.

3. A crystalline molecular sieve layer as claimed in claim 1 wherein the crystalline molecular sieve has been grown from molecular sieve seeds.

4. A crystalline molecular sieve layer as claimed in claim 1 wherein the permeance for para-xylene is 5.45×10$^{-8}$ mole(px)/m$^2$.s.Pa(px) or greater.

5. A crystalline molecular sieve layer as claimed in claim 1 wherein the selectivity for para-xylene over meta-xylene is 2.5 or greater.

6. A crystalline molecular sieve layer as claimed in claim 2 which has a ($\Delta\alpha_{px/mx}/\Delta t$) at t=2 hours of greater than 0.

7. A crystalline molecular sieve layer as claimed in claim 1 measured at an aromatic hydrocarbon partial pressure of $\geq$500×10$^3$ Pa.

8. A crystalline molecular sieve layer as claimed in claim 1 which is reparated and which has after reparation a selectivity ($\alpha_x$) for para-xylene over meta-xylene of 10 or greater and a permeance ($Q_x$) for para-xylene of 4.36×10$^{-9}$ mole(px)/m$^2$.s.Pa(px) or greater measured at a temperature of $\geq$250° C. and an aromatic hydrocarbon partial pressure of $\geq$10×10$^3$ Pa.

9. A crystalline molecular sieve layer as claimed in claim 7 measured at a temperature of 360° C. or greater.

10. A crystalline molecular sieve layer as claimed in claim 1 wherein the crystalline molecular sieve is an MFI type molecular sieve.

11. A process for the manufacture of a crystalline molecular sieve layer according to claim 1, which process comprises:

a) providing a support having deposited thereon seeds of molecular sieve crystals of average particle size of 200 nm or less, b) impregnating the support with an impregnating material before or after deposition of the seeds of molecular sieve, c) contacting the impregnated support having seeds deposited thereon with a molecular sieve synthesis mixture, d) subjecting the impregnated support having seeds deposited thereon to hydrothermal treatment, whilst in contact with the molecular sieve synthesis mixture, to form a crystalline molecular sieve layer on the support, and (e) removing the impregnating material from the support.

12. A process as claimed in claim 11 wherein a pre-impregnation masking layer is applied to the support prior to impregnation and is subsequently removed after impregnation.

13. A process as claimed in claim 11 wherein the molecular sieve synthesis mixture when formulated for the manufacture of a silicon containing molecular sieve, comprises a $H_2O:SiO_2$ molar ratio within the range of 7 to 100:1.

14. A process as claimed in claim 11 wherein the impregnating material is a hydrocarbon resin.

15. A process as claimed in claim 11 wherein the impregnating material is a hydrocarbon wax.

16. A process as claimed in claim 11 wherein the impregnating material is an acrylic resin.

17. A process as claimed in claim 11 wherein the average particle size of the molecular crystal seeds is 100 nm or less.

18. A process as claimed in claim 11 wherein the molecular sieve seed is deposited substantially as a monolayer.

19. A process as claimed in claim 18 wherein the monolayer seed layer is deposited via the use of charge reversal and a cationic polymer.

20. A process as claimed in claim 11 wherein the molecular sieve seed is present as a seed layer has a thickness of 3 µm or less.

21. A process as claimed in claim 1 wherein the temperature for hydrothermal synthesis is 100° C. or less.

22. A process as claimed in claim 11 wherein the crystalline molecular sieve layer is reparated.

23. A process as claimed in claim 12 wherein the pre-impregnation masking material is polymethylmethacrylate.

24. A process for enhancing the selectivity of a crystalline molecular sieve layer as claimed in claim 1 which process comprises, (i) exposing such a crystalline molecular sieve layer to a hydrocarbon stream comprising at least two components under pressure for a period of time, such that at least one component is separated from the stream, and (ii) at some point in time during the exposure increasing the partial pressure of at least one component of the hydrocarbon stream.

25. A selectivity enhanced crystalline molecular sieve layer prepared according to claim 24.

26. A process for the separation of at least one component from a hydrocarbon stream which process comprises exposing a molecular sieve as claimed in claim 1, to a hydrocarbon stream comprising at least two components such that at least one component is separated from the stream.

27. A process for the separation of para-xylene from a mixture comprising para-xylene and at least one other isomer of xylene, which process comprises exposing the mixture to a crystalline molecular sieve layer, as claimed in claim 1, at a temperature of $\geq 250°$ C. and an aromatic hydrocarbon feed partial pressure of $\geq 10 \times 10^3$ Pa.

\* \* \* \* \*